(12) United States Patent
Yamamoto et al.

(10) Patent No.: US 11,840,282 B2
(45) Date of Patent: Dec. 12, 2023

(54) WORK VEHICLE

(71) Applicant: KUBOTA CORPORATION, Osaka (JP)

(72) Inventors: Yasuo Yamamoto, Sakai (JP); Tadashi Nakamura, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/542,794

(22) Filed: Dec. 6, 2021

(65) Prior Publication Data

US 2022/0204091 A1 Jun. 30, 2022

(30) Foreign Application Priority Data

Dec. 24, 2020 (JP) ................................. 2020-215834

(51) Int. Cl.
*B62D 25/12* (2006.01)
*E05C 17/30* (2006.01)

(52) U.S. Cl.
CPC .............. *B62D 25/12* (2013.01); *E05C 17/30* (2013.01); *E05Y 2900/518* (2013.01); *E05Y 2900/536* (2013.01)

(58) Field of Classification Search
CPC .. B62D 25/10; B62D 25/12; B60Y 2200/221; E05F 1/1058; E05Y 2900/518; E05Y 2900/536; B60K 11/04
See application file for complete search history.

(56) References Cited

U.S. PATENT DOCUMENTS

| 5,535,846 A * | 7/1996 | Kurtz, Jr. | B62D 25/10 180/69.21 |
| 5,749,425 A * | 5/1998 | Cudden | B62D 25/10 180/69.2 |

(Continued)

FOREIGN PATENT DOCUMENTS

| DE | 101 44 791 A1 | 3/2003 |
| JP | 2003-082703 A | 3/2003 |

(Continued)

OTHER PUBLICATIONS

Official Communication issued in European Patent Application No. 21212188.3, dated May 25, 2022.

(Continued)

*Primary Examiner* — Gregory A Blankenship
(74) *Attorney, Agent, or Firm* — Keating & Bennett, LLP (57) ABSTRACT

A work vehicle includes a hood swingable in an up-down direction between an open position, in which the hood is positioned expose an engine room, and a closed position, in which the hood is positioned to close the engine room, and at least one damper to urge the hood toward a side of the open position. The damper is swingable in the up-down direction to rise toward a standing position in response to the hood being swung from a position closer to the closed position toward a position closer to the open position and fall toward a lying position in response to the hood being swung from the position closer to the open position to the position closer to the closed position. An urging mechanism is provided to, while the damper is in a position closer to the lying position than an intermediate position, apply to the hood an urging force to urge the hood from the position closer to the closed position toward the position closer to the open position against the load of the hood.

10 Claims, 4 Drawing Sheets

(56) References Cited

U.S. PATENT DOCUMENTS

| | | | | |
|---|---|---|---|---|
| 6,030,029 | A * | 2/2000 | Tsuda | B62D 25/10 |
| | | | | 296/203.02 |
| 7,909,125 | B1 * | 3/2011 | Keen | B62D 25/10 |
| | | | | 16/230 |
| 9,139,232 | B1 * | 9/2015 | De La rosa | B62D 49/00 |
| 10,543,744 | B2 | 1/2020 | Kurokawa | |
| 2003/0075371 | A1 * | 4/2003 | Haun | E05F 1/1276 |
| | | | | 180/69.21 |
| 2006/0000653 | A1 * | 1/2006 | Telford | B62D 25/10 |
| | | | | 180/69.21 |
| 2006/0070832 | A1 | 4/2006 | Adoline et al. | |
| 2006/0243505 | A1 | 11/2006 | Kuramoto et al. | |
| 2010/0122863 | A1 * | 5/2010 | Shoen | B62D 25/10 |
| | | | | 180/69.21 |
| 2012/0255801 | A1 * | 10/2012 | Shimada | E05F 1/1091 |
| | | | | 180/69.2 |
| 2015/0217634 | A1 * | 8/2015 | Sawai | F01N 3/021 |
| | | | | 280/834 |
| 2016/0031486 | A1 * | 2/2016 | Shoen | B60K 13/02 |
| | | | | 180/68.3 |
| 2017/0015191 | A1 * | 1/2017 | Kurokawa | B60K 13/04 |
| 2017/0072786 | A1 * | 3/2017 | Kurokawa | B60K 11/04 |
| 2017/0129542 | A1 * | 5/2017 | Kurokawa | A01B 69/02 |
| 2017/0129543 | A1 * | 5/2017 | Matsumoto | B60R 19/44 |
| 2017/0129544 | A1 * | 5/2017 | Komorida | B60Q 1/0433 |
| 2017/0156263 | A1 * | 6/2017 | Miller | B62D 21/02 |
| 2017/0313362 | A1 * | 11/2017 | Kurokawa | B62D 25/10 |
| 2018/0222532 | A1 * | 8/2018 | Waco | B62D 25/084 |
| 2019/0194996 | A1 | 6/2019 | Mulhofer et al. | |
| 2022/0098824 | A1 * | 3/2022 | Soejima | E02F 9/0891 |
| 2022/0105783 | A1 * | 4/2022 | Torii | B60H 1/32 |
| 2022/0204091 | A1 * | 6/2022 | Yamamoto | B62D 25/10 |
| 2022/0250466 | A1 * | 8/2022 | Yamaguchi | B62D 25/14 |

FOREIGN PATENT DOCUMENTS

| | | |
|---|---|---|
| JP | 2011-126531 A | 6/2011 |
| JP | 2012-201158 A | 10/2012 |

OTHER PUBLICATIONS

Official Communication issued in Japanese Patent Application No. 2020-215834, dated Oct. 10, 2023.

* cited by examiner

WORK VEHICLE

CROSS REFERENCE TO RELATED APPLICATIONS

This application is based on and claims priority under 35 U.S.C. Section 119 to Japanese Patent Application No. 2020-215834 filed on Dec. 24, 2020, the entire contents of which are incorporated herein by reference.

BACKGROUND OF THE INVENTION

1. Field of the Invention

The present invention relates to a work vehicle.

2. Description of the Related Art

A work vehicle may include an engine room housing an engine and a hood to expose and close the engine room. The hood may be swingable in an up-down direction between an open position, in which the hood stands to expose the engine room, and a closed position, in which the hood lies to close the engine room, and include a damper in the engine room, connected to the hood and a support included in the machine body, urging the hood toward a side of the open position, and switchable in the up-down direction to rise toward a standing position in response to the hood being swung from a side of the closed position to the side of the open position and fall toward a lying position in response to the hood being swung from the side of the open position to the side of the closed position. JP 2012-201158A, for example, discloses a tractor as a work vehicle of this type.

SUMMARY OF THE INVENTION

Conventional dampers can be disposed in, for example, a lying position corresponding to the closed position of the hood, a standing position corresponding to the open position of the hood, or an intermediate position at a particular angle between the lying position and the standing position. While the damper is being moved from the lying position to the intermediate position for the hood to be opened, the damper is in contact with the hood at an angle that prevents the damper from efficiently applying an urging force to the hood. This leads to a large manual load being required to open the hood, thus preventing the hood from being opened with a small force. Similarly, while the damper is being moved from the intermediate position to the lying position for the hood to be closed, a large manual load is required to close the hood, thus preventing the hood to from being closed with a small force.

Preferred embodiments of the present invention provide work vehicles each including a hood that can be opened and closed with a small force.

A work vehicle according to a preferred embodiment of the present invention includes an engine room housing an engine, a hood swingable in an up-down direction between (i) an open position, in which the hood stands to expose the engine room, and (ii) a closed position, in which the hood lies to close the engine room, at least one damper disposed in the engine room, connected to the hood and a support included in a machine body of the work vehicle, urging the hood toward a position closer to the open position, and swingable in the up-down direction to (i) rise toward a standing position in response to the hood being swung from a position closer to the closed position to the position closer to the open position and (ii) fall toward a lying position in response to the hood being swung from the position closer to the open position to the position closer to the closed position, and an urging mechanism to, while the at least one damper is in a position closer to the lying position than an intermediate position at a particular angle, apply to the hood an urging force to urge the hood from the position closer to the closed position toward the open position against a load of the hood.

With the above configuration, while the damper is being moved from a lying position (which corresponds to the closed position of the hood) to an intermediate position at a particular angle for the hood to be opened, the damper may fail to efficiently apply an urging force to the hood, but the hood is urged by the urging mechanism toward the open position. This reduces a manual load caused while the hood is being opened. Further, while the damper is being moved from the intermediate position to the lying position for the hood to be closed, the damper may also fail to efficiently apply an urging force to the hood, but the hood is urged by the urging mechanism toward the open position. This reduces a manual load caused while the hood is being closed. Thus, the above configuration enables the hood to be opened and closed with a small force.

The at least one damper may include a rod and a cylinder to apply an urging force in a direction in which the rod protrudes and extends from the cylinder, and the urging mechanism includes a compression spring disposed between the rod and the cylinder, swingable in the up-down direction integrally with the at least one damper, and capable of being stretched and compressed in a direction in which the at least one damper is stretched and compressed, and, in response to the at least one damper being moved from a position closer to the standing position than the intermediate position and reaching the intermediate position, become sandwiched between a first portion of the rod and a second portion of the cylinder and start becoming compressed by the first portion and the second portion.

A preferred embodiment of the present invention includes a simple assist structure to urge the hood toward the open position, including a compression spring that, in response to the damper being moved from a position closer to the standing position than the intermediate position and reaching the intermediate position, becomes sandwiched between a first portion of the rod and a second portion of the cylinder and starts becoming compressed by the first portion and the second portion. This allows the hood to be opened and closed with a small force.

The compression spring may be spaced apart from at least either the first portion or the second portion while the at least one damper is in a position closer to the standing position than the intermediate position.

The above configuration suitably prevents the compression spring from acting while the damper is in a position closer to the standing position than a particular intermediate position, and enables the compression spring to act while the damper is in a position closer to the lying position than the intermediate position. This allows the hood to be urged by only the damper while the damper is in a position closer to the standing position than the intermediate position, thus allowing the hood to be opened and closed easily. The above configuration also allows the hood to be urged by the compression spring while the damper is in a position closer to the lying position than the intermediate position, thus allowing the hood to be opened and closed with a small force.

The intermediate position may correspond to an elevation angle of the at least one damper of about 40 degrees to about 50 degrees relative to a horizontal direction.

The above configuration suitably allows the compression spring to start becoming compressed in response to the damper being moved from a position closer to the standing position and reaching the intermediate position, regardless of one or more variations in the urging force of the damper, the urging force of the compression spring, and the weight of the hood. This allows the hood to be opened and closed with a small force, regardless of any of the above variations.

The at least one damper may include a single damper that is connected to an inner surface of an intermediate portion of the hood with respect to a direction in which the hood extends and that extends over the engine when the hood is in the closed position.

The damper applies an urging force to the hood more efficiently in a case where the damper is connected to an intermediate portion of the hood with respect to its extending direction than in a case where the damper is connected to a front end portion of the hood with respect to its extending direction. The above configuration thus includes a single damper for the hood to be opened and closed with a small force.

The hood may includes a top plate, and a side plate extending downward from a lateral end portion of the top plate, and the at least one damper may coincide with the side plate in a side view of the machine body when the hood is in the open position.

With the above configuration, the damper is not a hindrance to a person who is on a lateral side of the machine body to maintain a component in the engine room while the hood is in the open position. This makes the maintenance work easy.

A work vehicle according to a preferred embodiment of the present invention may preferably further include a fuel tank rearward of the engine, a heat shield between the engine and the fuel tank, and a support frame rearward of the fuel tank, wherein the hood is held by an upper portion of the support frame so as to be swingable in the up-down direction, and the at least one damper is held by an upper portion of the heat shield so as to be swingable in the up-down direction.

The above configuration allows the heat shield to double as a support of the damper and thus simplifies the damper supporting structure on the machine body. The above configuration also allows the damper to be supported by a portion on the machine body that is different from the portion on the machine body by which the hood is supported.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The description below describes preferred embodiments of the present invention with reference to drawings.

In the description below of a machine body of a tractor (which is an example of a "work vehicle"), arrow F shown in FIGS. 1 and 2 indicates the forward direction of the machine body, arrow B shown in FIGS. 1 and 2 indicates the rearward direction of the machine body, arrow U shown in FIG. 1 indicates the upward direction of the machine body, arrow D shown in FIG. 1 indicates the downward direction of the machine body, arrow L shown in FIG. 2 indicates the leftward direction of the machine body, and arrow R shown in FIG. 2 indicates the rightward direction of the machine body.

Figure 1:
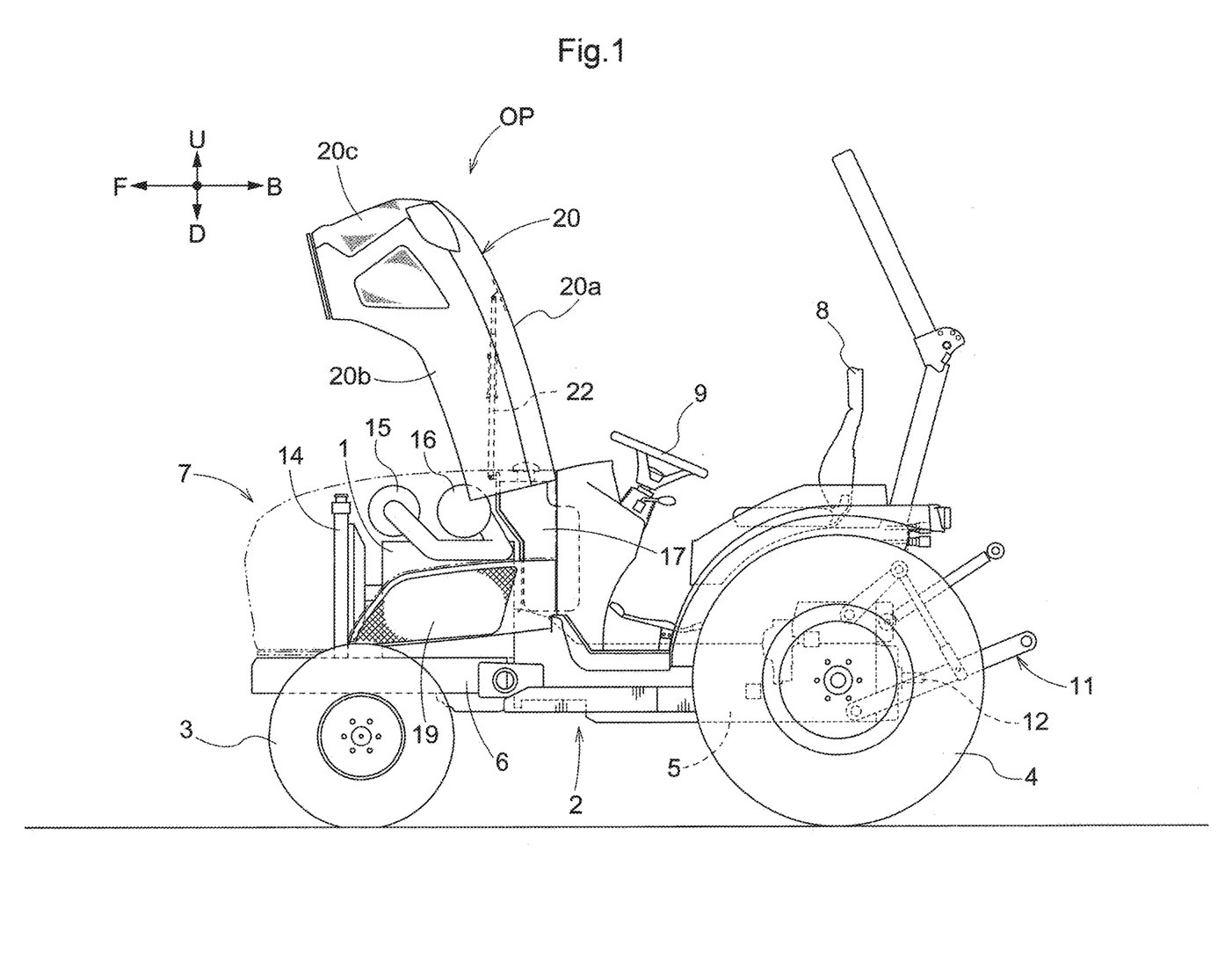
FIG. 1 is a left side view of a tractor in its entirety with a hood top in the open position.
Figure 2:
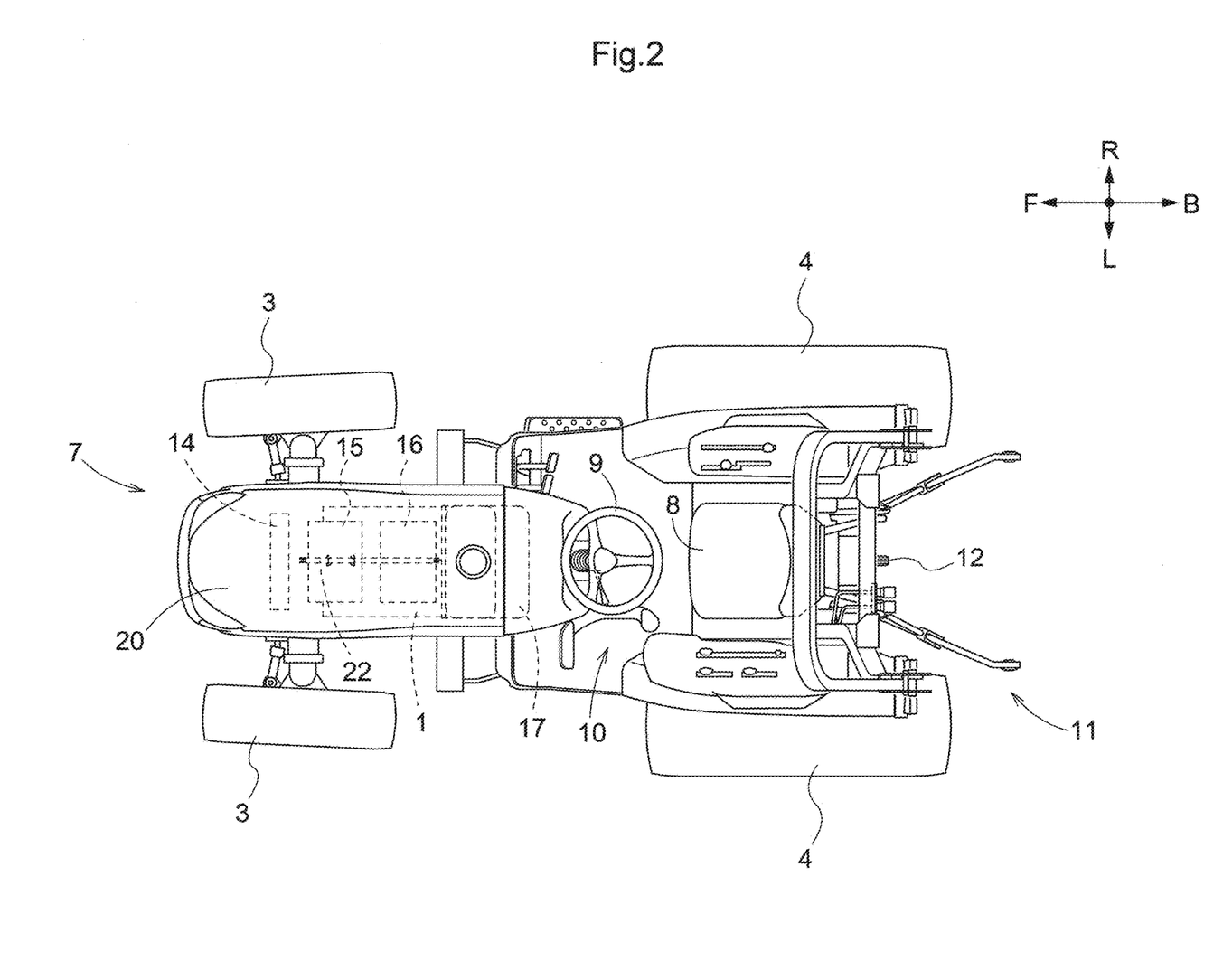
FIG. 2 is a plan view of a tractor in its entirety.

As illustrated in FIGS. 1 and 2, the tractor includes an engine 1, a body frame 2 including the engine 1, a pair of left and right drivable front wheels 3 disposed at a front portion of the body frame 2 and having a changeable direction, and a pair of left and right drivable rear wheels 4 disposed at a rear portion of the body frame 2. The body frame 2 includes the engine 1, a transmission case 5 extending in the front-back direction of the machine body and including a front portion connected to a back portion of the engine 1, and a front frame 6 extending forward from under the engine 1. The tractor includes, at a front portion of the machine body, a motor section 7 housing the engine 1. The tractor includes, at a back portion of the machine body, a driver section 10 including a driver's seat and a steering wheel 9 to change the direction of the front wheels 3. The tractor also includes, at a back portion of the transmission case 5, (i) a link mechanism 11 to which any of various work devices such as a rotary tiller device (not shown in the drawings) is linkable so as to be capable of being lifted and lowered and (ii) a power takeoff shaft 12 to take power from the engine 1 and transmit the power to the work device linked thereto.

Figure 3:
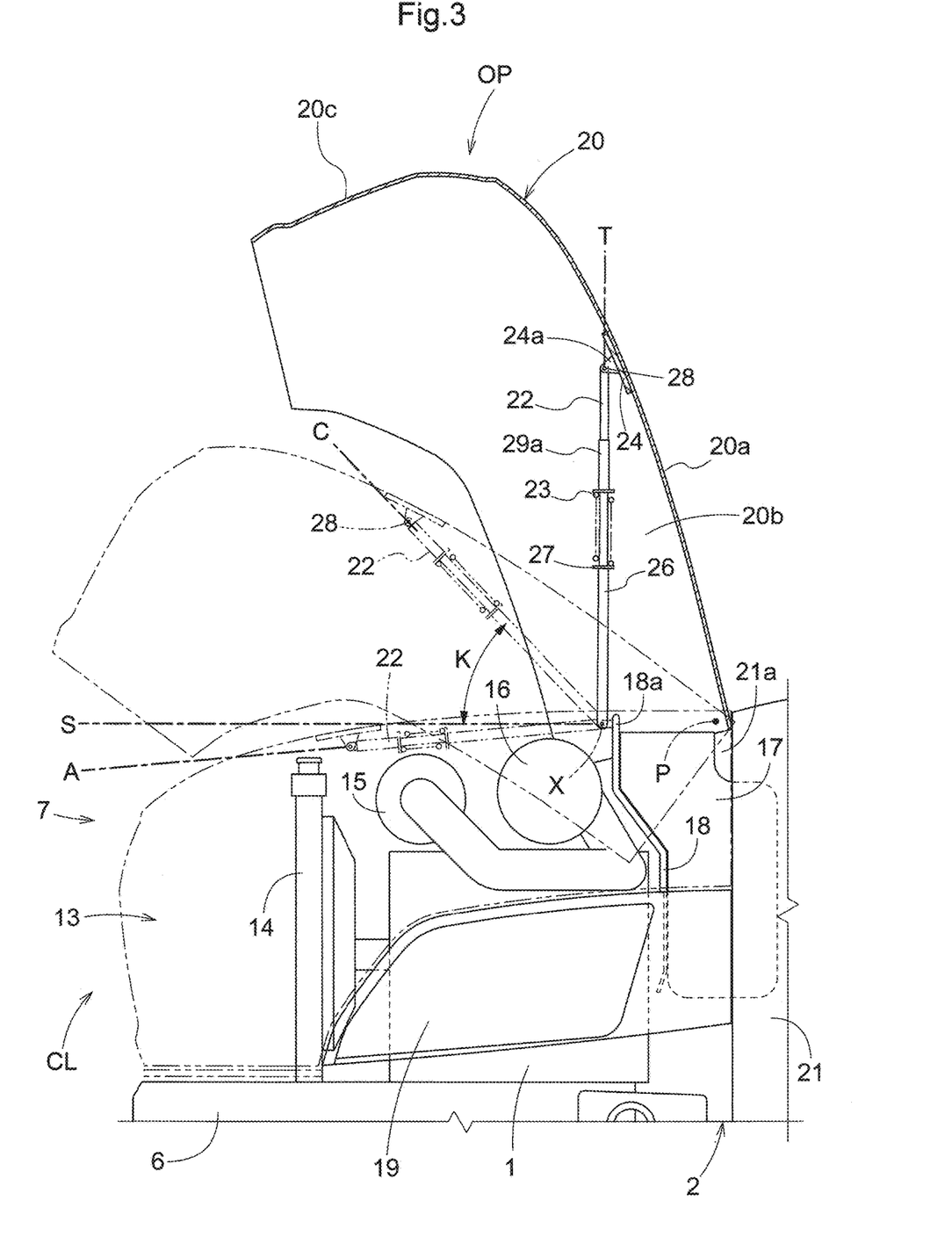
FIG. 3 is an explanatory diagram illustrating how a damper and a compression spring function.

As illustrated in FIGS. 1 and 3, the motor section 7 includes an engine room 13 housing the engine 1. The motor section 7 also includes a radiator 14 positioned forward of the engine 1 and configured to cool the engine 1. The motor section 7 also includes, over the engine 1, (i) an air cleaner 15 configured to remove dust from combustion air to be supplied into the engine 1 and (ii) an exhaust gas cleaning device 16 configured to clean exhaust gas discharged from the engine 1. The motor section 7 also includes a fuel tank 17 positioned rearward of the engine 1 and configured to store fuel to be supplied into the engine 1. The motor section 7 also includes a heat shield 18 standing between the engine 1 and the fuel tank 17 and configured to reduce heat transfer from the engine 1 to the fuel tank 17.

The engine room 13 is defined by (i) left and right hood sides 19 disposed at opposite sides of the motor section 7 and laterally facing members such as the engine 1 and (ii) a hood top 20 covering members such as the engine 1 from above. The hood sides 19 are detachably supported by the machine body.

As illustrated in FIGS. 1 and 3, the hood top 20 is held by the machine body so as to be swingable in the up-down direction between (i) an open position OP, in which the hood top 20 stands to expose the engine room 13, and (ii) a closed position CL, in which the hood top 20 lies to close the engine room 13.

The present preferred embodiment is arranged as illustrated in FIG. 3 to include a support frame 21 positioned rearward of the engine 1 and standing on the body frame 2. The support frame 21 includes, at an upper portion thereof, a support section 21a holding a back portion of the hood top 20 such that the hood top 20 is rotatable about a rotation axis P extending in the width direction of the machine body. The hood top 20 is held by the upper portion of the support frame 21 so as to be swingable in the up-down direction between the open position OP and the closed position CL about the rotation axis P positioned at the back portion of the hood top 20.

As illustrated in FIGS. 1 and 3, the motor section 7 includes, in the engine room 13, a damper 22 connected to the hood top 20 and a support section 18a included in the machine body. The damper 22 is configured to urge the hood top 20 toward the open position side. The damper 22 is held by the support section 18a so as to be swingable in the up-down direction to (i) rise toward a standing position in response to the hood top 20 being swung from the closed position side to the open position side and (ii) fall toward a lying position in response to the hood top 20 being swung from the open position side to the closed position side.

With reference to FIG. 3, the damper 22 can be in, for example, a lying position A corresponding to the closed position of the hood top 20, a standing position T corresponding to the open position of the hood top 20, or an intermediate position C at a particular angle between the lying position A and the standing position T. The damper 22 is, when in a position on the lying position side relative to the intermediate position C, in contact with the hood top 20 at an angle that prevents the damper 22 from efficiently applying an urging force to the hood top 20 to urge the hood top 20 toward the open position side. Variations may occur in the urging force of the damper 22, the attachment angle of the damper 22, and the weight of the hood top 20. One or more of these variations lead to a variation in the contact angle that prevents the damper 22 from efficiently applying an urging force to the hood top 20. Depending on one or more of the above variations, the intermediate position C of the damper 22 corresponds to an elevation angle K within the range of about 40 degrees to about 50 degrees relative to the horizontal direction (indicated with line S), for example.

The damper 22, when in a position on the lying position side relative to the intermediate position C, does not efficiently apply an urging force to the hood top 20. In view of that, the motor section 7 includes an urging mechanism 23 configured to act on the hood top 20 as illustrated in FIG. 3. The urging mechanism 23 is configured to apply to the hood top 20 an urging force to urge the hood top 20 from the closed position side to the open position side when the damper 22 is in a position on the lying position side relative to the intermediate position C. While the damper 22 is being moved between the lying position A and the intermediate position C for the hood top 20 to be opened or closed, the damper 22 does not efficiently apply an urging force to the hood top 20. However, the urging mechanism 23 urges the hood top 20 toward the open position side to reduce a manual load necessary to open or close the hood top 20.

Specifically, the damper 22 includes a first end that is held by the support section 18a, which is at an upper portion of the heat shield 18, and that is connected to the machine body with the heat shield 18 therebetween as illustrated in FIG. 3. The damper 22 includes a second end connected to the inner surface of the hood top 20. Specifically, the second end of the damper 22 is connected to an intermediate portion of the hood top 20 with respect to its extending direction. The extending direction of the hood top 20 refers to the direction in which the hood top 20 extends from the support section 21a to the free end of the hood top 20. The hood top 20 includes an inner surface provided with a reinforcement member 24 including a support section 24a. Connecting the damper 22 to the support section 24a can connect the damper 22 to the hood top 20.

Figure 4:
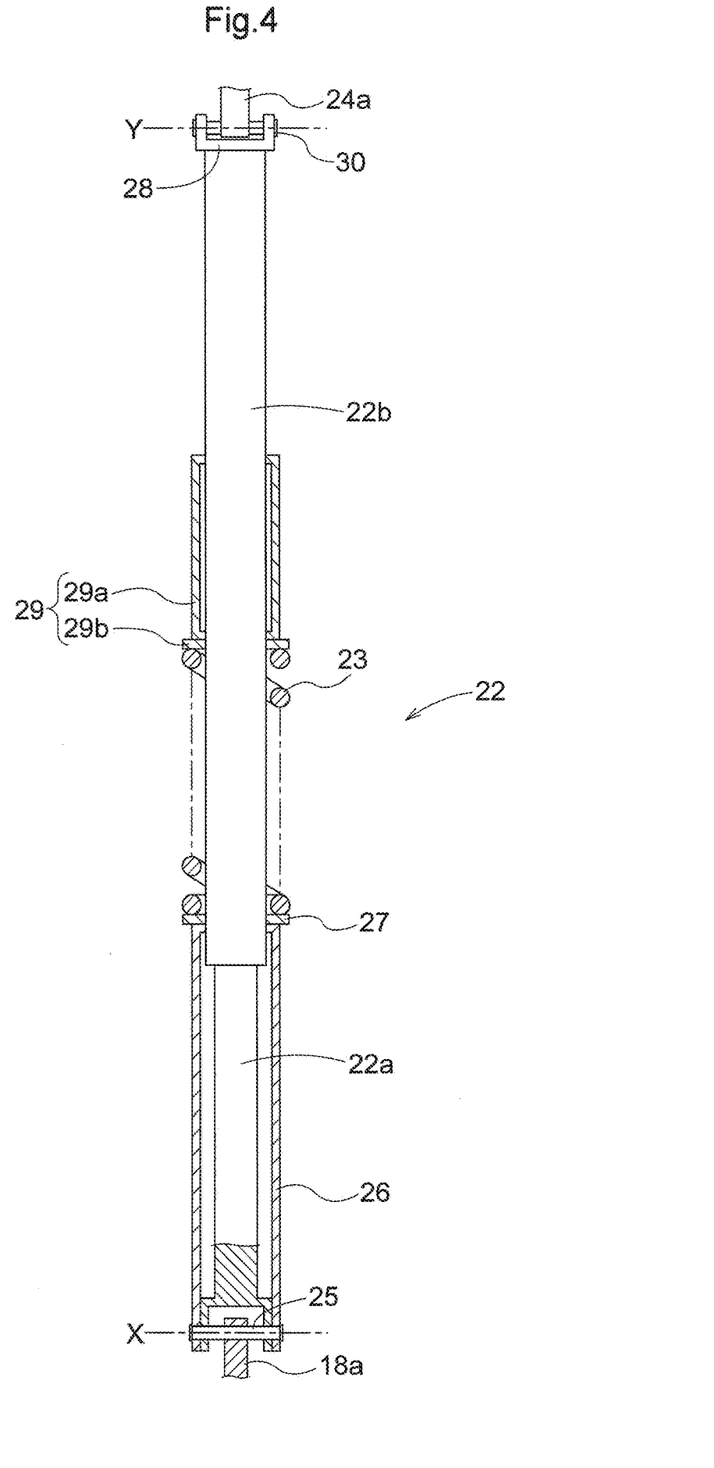
FIG. 4 is a cross-sectional view of a damper and a compression spring.

As illustrated in FIG. 4, the damper 22 includes a rod 22a and a cylinder 22b containing compressed gas that applies an urging force to the rod 22a in the direction in which the rod 22a protrudes and extends from the cylinder 22b. The damper 22 uses the urging force, applied in the direction in which the rod 22a extends, to urge the hood top in the direction from the closed position side to the open position side. The rod 22a is connected to the support section 18a of the machine body (specifically, the heat shield 18) with the use of a connecting pin 25 so as to be rotatable about the axis X of the connecting pin 25. The cylinder 22b is connected to the support section 24a of the hood top 20 with the use of a connecting pin 30 so as to be rotatable about the axis Y of the connecting pin 30. The damper 22 includes a cylindrical cover 26 fitted around the rod 22a and the cylinder 22b. The cylindrical cover 26 includes an end portion connected to an end portion of the rod 22a with the use of the connecting pin 25. The cylindrical cover 26 is slidable relative to the cylinder 22b in response to the rod 22a being inserted into or pulled out of the cylinder 22b.

As illustrated in FIG. 4, the urging mechanism 23 is in the form of a compression spring. The compression spring for the present preferred embodiment is a coil spring. The description below refers to the urging mechanism as the compression spring 23.

As illustrated in FIG. 4, the compression spring 23 is disposed between the rod 22a and the cylinder 22b, and is swingable about the axis X integrally with the damper 22.

Specifically, the compression spring 23 is fitted around the damper 22 and positioned between a member 27 provided for and held by the rod 22a (hereinafter referred to as "rod-side member 27") and a member 28 provided for and held by the cylinder 22b (hereinafter referred to as "cylinder-side member 28"). The rod-side member 27 is connected to an end portion of the cylindrical cover 26 and held by the rod 22a with the cylindrical cover 26 and the connecting pin 25 therebetween. The rod-side member 27 is movable along the axis of the damper 22 relative to the cylinder 22b integrally with the rod 22a. The cylinder-side member 28 is integral with the cylinder 22b. The compression spring 23 is provided with an operation section 29 configured to be pressed by the cylinder-side member 28 to compress the compression spring 23. The operation section 29 includes a spacer section 29a slidably fitted around the cylinder 22b and a press section 29b connected to that end of the spacer section 29a which is closer to the compression spring 23.

The compression spring 23 and the rod-side member 27 are not connected to each other. The compression spring 23 is thus capable of being spaced apart from the rod-side member 27. The spacer section 29a and the cylinder-side member 28 are not connected to each other. The compression spring 23 is thus capable of being spaced apart from the cylinder-side member 28. The compression spring 23 is capable of being spaced apart from at least either the rod-side member 27 or the cylinder-side member 28 when the damper 22 is in on the standing position side of the intermediate position C. The damper 22 illustrated in FIG. 4 is in the standing position, which corresponds to the open position OP of the hood top 20. In this state, the compression spring 23 is down on the rod side relative to the cylinder 22b and in contact with the rod-side member 27. Further, the spacer section 29a is down on the rod side relative to the cylinder 22b, so that the compression spring 23 is apart from the cylinder-side member 28.

The damper 22 contracts in response to being moved from a position on the standing position side of the intermediate position C to the intermediate position C. This causes the cylinder-side member 28 to come into contact with the spacer section 29a and slide the operation section 29 toward the compression spring 23. During this operation, the rod-side member 27 is supported by the rod 22a with the cylindrical cover 26 and the connecting pin 25 therebetween. In response to the damper 22 being moved from a position on the standing position side to the intermediate position C, the rod-side member 27 and the cylinder-side member 28 sandwich the compression spring 23 and start to compress the compression spring 23.

As illustrated in FIG. 3, when the hood top 20 is moved from the open position OP to be closed, the compression spring 23 and the cylinder-side member 28 remain spaced apart from each other so that the compression spring 23 remains uncompressed until the damper 22 reaches the intermediate position C. Thus, during this period, the hood top 20 is lowered manually while being supported only by the urging force of the damper 22 applied against the load of the hood top 20. Once the damper 22 reaches the intermediate position C as the hood top 20 is lowered, the compression spring 23 starts to become compressed between the rod-side member 27 and the cylinder-side member 28. After that, the hood top 20 is lowered manually while being supported by the resultant of the urging force of the damper 22 and that of the compression spring 23 applied against the load of the hood top 20. The hood top 20 reaches the closed position CL as a result of the force of gravity acting thereon against the resultant of the urging force of the damper 22 and that of the compression spring 23.

As illustrated in FIGS. 2 and 3, the motor section 7 includes a single damper 22 connected to the inner surface of an intermediate portion of the hood top 20 with respect to its extending direction with the reinforcement member 24 therebetween. The damper 22 extends in the front-back direction over the engine 1 when the hood top 20 is in the closed position.

The hood top 20, as illustrated in FIG. 1, includes a top plate 20a, side plates 20b, and a front grille 20c. The top plate 20a is configured to cover, for example, the engine 1 from above. The side plates 20b extend downward from opposite lateral ends of the top plate 20a, and are configured to face, for example, an upper portion of the engine 1, the air cleaner 15, and the exhaust gas cleaning device 16. The front grille 20c extends downward from a front portion of the top plate 20a, and is configured to face, for example, the radiator 14 from forward.

As illustrated in FIGS. 1 and 3, the damper 22 coincides with the side plates 20b in a side view of the machine body when the hood top 20 is in the open position OP. The damper 22 is thus not a hindrance to a person who is on a lateral side of the machine body to maintain a component in the engine room 13 with the hood top 20 in the open position OP.

Alternative Preferred Embodiments (1) The preferred embodiment described above is an example including a damper 22 that has an urging force acting in the direction in which the damper 22 extends. The present invention may, however, alternatively be embodied to include a damper that has an urging force acting in the direction in which the damper 22 contracts.

(2) The preferred embodiment described above is an example in which the urging mechanism 23 is held by the damper 22. The urging mechanism 23 may, however, alternatively be held by a support other than the damper. The preferred embodiment described above is an example in which the urging mechanism 23 is a compression spring. The urging mechanism 23 may, however, alternatively be a tension spring. The preferred embodiment described above is an example in which the urging mechanism 23 is a coil spring. The urging mechanism 23 may, however, alternatively be a spring in any shape such as a plate shape.

(3) The preferred embodiment described above is arranged such that the intermediate position C of the damper 22 corresponds to an inclination at an elevation angle K of about 40 degrees to about 50 degrees relative to the horizontal direction, for example. The intermediate position C may, however, alternatively correspond to an inclination at an angle of smaller than about 40 degrees or larger than about 50 degrees.

(4) The preferred embodiment described above is an example in which the member 27 for the rod is held by the rod 22a with the cylindrical cover 26 and the connecting pin therebetween. The present invention is, however, not limited to such an arrangement, and may alternatively be embodied such that the member 27 for the rod is directly supported by the rod 22a.

(5) The preferred embodiment described above is an example in which the compression spring 23 is capable of being spaced apart from the operation section 29. The compression spring 23 may, however, alternatively be connected to the operation section 29. Further, the compression spring 23 may alternatively be provided with no operation section 29, so that the compression spring 23 comes into direct contact with the member 28 for the cylinder and is consequently compressed.

(6) The preferred embodiment described above is an example in which the compression spring 23 is capable of being spaced apart from each of the member 27 for the rod and the member 28 for the cylinder when the damper 22 is in a position on the standing position side of the intermediate position C. The present invention may, however, alternatively be embodied such that the compression spring 23 is capable of being spaced apart from at least either the member 27 for the rod or the member 28 for the cylinder when the damper 22 is in a position on the standing position side of the intermediate position C.

(7) The preferred embodiment described above is an example including a single damper 22. The present invention may, however, alternatively be embodied to include two or more dampers.

(8) The preferred embodiment described above is an example in which the hood top 20 includes side plates 20b and in which the damper 22 coincides with the side plates 20b when the hood top 20 is in the open position OP. The present invention is, however, not limited to such an arrangement. The hood top 20 may alternatively include no side plates 20b. A preferred embodiment of the present invention may further alternatively be embodied such that the hood top 20 includes side plates 20b and that the damper 22 does not coincide with the side plates 20b when the hood top 20 is in the open position OP.

(9) The preferred embodiment described above is an example in which the hood top 20 is swingable in the up-down direction about a rotation axis P at a back portion of the hood top 20. The hood top 20 may, however, alternatively be swingable in the up-down direction about a rotation axis at a front portion of the hood top 20. The hood top 20 may further alternatively be swingable laterally to the machine body about a rotation axis extending in the front-back direction of the machine body so that the hood top 20 is in the open position.

(10) The preferred embodiment described above is an example in which the damper 22 is held by the heat shield 18. The damper 22 may, however, alternatively be held by any other component such as a dedicated support.

Preferred embodiments of the present invention are applicable to not only tractors but also various other work vehicles such as rice transplanters, conveyer vehicles, and multipurpose vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle, comprising:
    an engine room housing an engine;
    a hood swingable in an up-down direction between, about an axis disposed in a rear end portion of the hood, (i) an open position, in which the hood stands to expose the engine room, and (ii) a closed position, in which the hood lies to close the engine room;
    at least one damper disposed in the engine room, connected to the hood and a support disposed in an upper rear portion of the engine room, urging the hood toward the open position, and swingable in the up-down direction to (i) rise toward a standing position in response to the hood being swung from a position closer to the closed position to a position closer to the open position and (ii) fall toward a lying position in response to the hood being swung from the position closer to the open position to the position closer to the closed position; and
    an urging mechanism to, while the at least one damper is in a position closer to the lying position than an intermediate position, apply to the hood an urging force for urging the hood from the position closer to the closed position toward the position closer to the open position against a load of the hood.

2. The work vehicle according to claim 1, wherein
    the at least one damper includes a rod and a cylinder and applies an urging force in a direction in which the rod protrudes and extends from the cylinder; and
    the urging mechanism includes a compression spring between the rod and the cylinder, swingable in the up-down direction integrally with the at least one damper, and capable of being stretched and compressed in a direction in which the at least one damper is stretched and compressed, and is configured to, in response to the at least one damper being moved from the position closer to the standing position than the intermediate position and reaching the intermediate position, become sandwiched between a first portion of the rod and a second portion of the cylinder and start becoming compressed by the first portion and the second portion.

3. The work vehicle according to claim 2, wherein the compression spring is spaced apart from at least either the first portion or the second portion while the at least one damper is in a position closer to the standing position relative than the intermediate position.

4. The work vehicle according to claim 2, wherein the intermediate position corresponds to an elevation angle of the at least one damper of about 40 degrees to about 50 degrees relative to a horizontal direction.

5. The work vehicle according to claim 1, wherein the at least one damper includes a single damper that is connected to an inner surface of an intermediate portion of the hood with respect to a direction in which the hood extends and that extends over the engine when the hood is in the closed position.

6. The work vehicle according to claim 1, wherein
    the hood includes:
    a top plate; and
    a side plate extending downward from a lateral end portion of the top plate; and
    the at least one damper coincides with the side plate in a side view of a machine body of the work vehicle when the hood is in the open position.

7. The work vehicle according to claim 1, further comprising:
    a fuel tank rearward of the engine;
    a heat shield between the engine and the fuel tank; and
    a support frame rearward of the fuel tank; wherein
    the hood is held by an upper portion of the support frame so as to be swingable in the up-down direction; and
    the at least one damper is held by an upper portion of the heat shield so as to be swingable in the up-down direction.

8. A work vehicle, comprising:
    an engine room housing an engine;
    a hood swingable in an up-down direction between (i) an open position, in which the hood stands to expose the engine room, and (ii) a closed position, in which the hood lies to close the engine room;
    at least one damper disposed in the engine room, connected to the hood and a support included in a machine body of the work vehicle, urging the hood toward the open position, and swingable in the up-down direction to (i) rise toward a standing position in response to the hood being swung from a position closer to the closed position to a position closer to the open position and (ii) fall toward a lying position in response to the hood being swung from the position closer to the open position to the position closer to the closed position; and
    an urging mechanism to, while the at least one damper is in a position closer to the lying position than an intermediate position, apply to the hood an urging force for urging the hood from the position closer to the closed position toward the position closer to the open position against a load of the hood; wherein
    the at least one damper includes a rod and a cylinder and applies an urging force in a direction in which the rod protrudes and extends from the cylinder; and
    the urging mechanism includes a compression spring between the rod and the cylinder, swingable in the up-down direction integrally with the at least one damper, and capable of being stretched and compressed in a direction in which the at least one damper is stretched and compressed, and is configured to, in response to the at least one damper being moved from the position closer to the standing position than the intermediate position and reaching the intermediate position, become sandwiched between a first portion of the rod and a second portion of the cylinder and start becoming compressed by the first portion and the second portion.

9. A work vehicle, comprising:
    an engine room housing an engine;

a hood swingable in an up-down direction between (i) an open position, in which the hood stands to expose the engine room, and (ii) a closed position, in which the hood lies to close the engine room;

at least one damper disposed in the engine room, connected to the hood and a support included in a machine body of the work vehicle, urging the hood toward the open position, and swingable in the up-down direction to (i) rise toward a standing position in response to the hood being swung from a position closer to the closed position to a position closer to the open position and (ii) fall toward a lying position in response to the hood being swung from the position closer to the open position to the position closer to the closed position; and an urging mechanism to, while the at least one damper is in a position closer to the lying position than an intermediate position, apply to the hood an urging force for urging the hood from the position closer to the closed position toward the position closer to the open position against a load of the hood; wherein the at least one damper includes a single damper that is connected to an inner surface of an intermediate portion of the hood with respect to a direction in which the hood extends and that extends over the engine when the hood is in the closed position.

10. A work vehicle, comprising:

an engine room housing an engine;

a hood swingable in an up-down direction between (i) an open position, in which the hood stands to expose the engine room, and (ii) a closed position, in which the hood lies to close the engine room;

at least one damper disposed in the engine room, connected to the hood and a support included in a machine body of the work vehicle, urging the hood toward the open position, and swingable in the up-down direction to (i) rise toward a standing position in response to the hood being swung from a position closer to the closed position to a position closer to the open position and (ii) fall toward a lying position in response to the hood being swung from the position closer to the open position to the position closer to the closed position;

an urging mechanism to, while the at least one damper is in a position closer to the lying position than an intermediate position, apply to the hood an urging force for urging the hood from the position closer to the closed position toward the position closer to the open position against a load of the hood;

a fuel tank rearward of the engine;

a heat shield between the engine and the fuel tank; and a support frame rearward of the fuel tank; wherein the hood is held by an upper portion of the support frame so as to be swingable in the up-down direction; and the at least one damper is held by an upper portion of the heat shield so as to be swingable in the up-down direction.

\* \* \* \* \*